(12) United States Patent
Stuntz

(10) Patent No.: US 6,489,530 B1
(45) Date of Patent: Dec. 3, 2002

(54) PROCESS FOR SELECTIVELY PRODUCING C3 OLEFINS IN A FLUID CATALYTIC CRACKING PROCESS

(75) Inventor: Gordon F. Stuntz, Baton Rouge, LA (US)

(73) Assignee: Exxon Mobile Chemical Patents Inc., Houston, TX (US)

( * ) Notice: Subject to any disclaimer, the term of this patent is extended or adjusted under 35 U.S.C. 154(b) by 0 days.

(21) Appl. No.: 09/574,262

(22) Filed: May 19, 2000

Related U.S. Application Data

(63) Continuation-in-part of application No. 09/073,083, filed on May 5, 1998, now Pat. No. 6,098,867.

(51) Int. Cl.$^7$ ................................. C07C 4/06
(52) U.S. Cl. .................. 585/648; 585/651; 585/654; 585/502; 585/518; 208/118; 208/120.01; 208/122
(58) Field of Search ................ 585/648, 651, 585/654, 502, 518; 208/118, 120.01, 122

(56) References Cited

U.S. PATENT DOCUMENTS

| | | | |
|---|---|---|---|
| 3,442,792 A | 5/1969 | Eng et al. | 208/62 |
| 3,928,172 A | 12/1975 | Davis, Jr. et al. | 208/77 |
| 4,171,257 A | 10/1979 | O'Rear et al. | 208/120 |
| 4,282,085 A | 8/1981 | O'Rear et al. | 208/120 |
| 4,502,945 A | 3/1985 | Olbrich et al. | 208/120 |
| 4,830,728 A | 5/1989 | Herbst et al. | 208/78 |
| 4,865,718 A | 9/1989 | Herbst et al. | 208/70 |
| 4,950,387 A | 8/1990 | Harandi et al. | 208/49 |
| 5,026,935 A | 6/1991 | Leyshon et al. | 585/315 |
| 5,026,936 A | 6/1991 | Leyshon et al. | 585/315 |
| 5,043,522 A | 8/1991 | Leysohn et al. | 585/651 |
| 5,069,776 A | 12/1991 | Biswas et al. | 208/120 |
| 5,160,424 A | 11/1992 | Le et al. | 208/67 |
| 5,171,921 A | 12/1992 | Gaffney et al. | 585/653 |
| 5,292,976 A | 3/1994 | Dessau et al. | 585/322 |
| 5,372,704 A | 12/1994 | Harandi et al. | 208/74 |
| 5,378,352 A | 1/1995 | Degnan et al. | 208/217 |
| 5,389,232 A | 2/1995 | Adewuyi et al. | 208/120 |
| 5,396,010 A | 3/1995 | Harandi et al. | 585/418 |
| 5,414,172 A | 5/1995 | Chin et al. | 585/322 |
| 5,472,594 A | 12/1995 | Tsang et al. | 208/114 |
| 5,865,987 A | 2/1999 | Borghard et al. | 208/97 |
| 5,865,988 A | 2/1999 | Collins et al. | 208/97 |
| 6,069,287 A * | 5/2000 | Ladwig et al. | 585/648 |
| 6,093,867 A * | 7/2000 | Ladwig et al. | 585/648 |
| 6,106,697 A * | 8/2000 | Swan et al. | 208/77 |
| 6,118,035 A * | 9/2000 | Fung et al. | 585/653 |
| 6,258,257 B1 * | 7/2001 | Swan, III et al. | 208/74 |
| 6,258,990 B1 * | 7/2001 | Fung et al. | 585/330 |

FOREIGN PATENT DOCUMENTS

| | | | | |
|---|---|---|---|---|
| EP | 0347003 B1 | 5/1996 | | C10G/11/05 |
| WO | WO98/56874 | 12/1998 | | C10G/11/00 |

\* cited by examiner

*Primary Examiner*—Nadine Preisch

(57) ABSTRACT

A process for producing polymers from olefins selectively produced from a catalytically cracked or thermally cracked naphtha stream is disclosed herein. The naphtha feedstream is contacted in the reaction zone with a catalyst under catalytic conversion concditions. Vapor products are collected overhead and the catalyst particles are passed through the stripping zone on the way to the catalyst regeneration zone. Volatiles are stripped with steam in the stripping zone and the catalyst particles are sent to the catalyst regeneration zone where coke is burned from the catalyst, which is then recycled to the reaction zone. A stream rich in $C_4$ and/or $C_5$ olefins is recycled to the stripping zone.

16 Claims, No Drawings

PROCESS FOR SELECTIVELY PRODUCING C3 OLEFINS IN A FLUID CATALYTIC CRACKING PROCESS

CROSS-REFERENCE TO RELATED APPLICATION

This is a continuation-in-part of U.S. patent application Ser. No. 09/073,083, filed May 5, 1998, now U.S. Pat. No. 6,098,867.

BACKGROUND

The present invention relates to a process for producing propylene from a naphtha stream.

The need for low emissions fuels has created an increased demand for light olefins used in alkylation, oligomerization, MTBE and ETBE synthesis processes. In addition, a low-cost supply of light olefins, particularly propylene, continues to be in demand to serve as feedstock for polyolefin, particularly polypropylene.

Fixed bed processes for light paraffin dehydrogenation have recently attracted renewed interest for increasing olefin production. However, these types of processes typically require relatively large capital investments and high operating costs. It is therefore advantageous to increase olefin yield using processes, which require relatively small capital investment. It would be particularly advantageous to increase olefin yield in catalytic cracking processes so that the olefins could be further processed into polymers such as polypropylene.

A problem inherent in producing olefins products using FCC units is that the process depends on a specific catalyst balance to maximize production of light olefins while also achieving high conversion of the 650° F.+(~340° C.) feed components. In addition, even if a specific catalyst balance can be maintained to maximize overall olefin production, olefin selectivity is generally low because of undesirable side reactions, such as extensive cracking, isomerization, aromatization and hydrogen transfer reactions. Light saturated gases produced from undesirable side reactions result in increased costs to recover the desirable light olefins. Therefore, it is desirable to maximize olefin production in a process that allows a high degree of control over the selectivity of $C_3$ and $C_4$ olefins.

SUMMARY OF THE INVENTION

One embodiment of the present invention is a process for producing polypropylene comprising the steps of (a) feeding a naphtha stream comprising from about 10 to 30 wt. % paraffins and between about 15 to 70 wt. % olefins and co-feeding a stream comprising $C_4$ olefins to a process unit comprising a reaction zone, a stripping zone, a catalyst regeneration zone, and a fractionation zone; (b) contacting the naphtha stream with a fluidized bed of catalyst in the reaction zone to form a cracked product, the catalyst comprising a zeolite having an average pore diameter of less than about 0.7 nm and wherein the reaction zone is operated at a temperature from about 5000 to 650° C., a hydrocarbon partial pressure of 10 to 40 psia (about 70-about 280 kPa), a hydrocarbon residence time of 1 to 10 seconds, and a catalyst to feed weight ratio between about 4 and about 10, thereby producing a reaction product wherein no more than about 20 wt. % of paraffins are converted to olefins and wherein propylene comprises at least about 90 mol. % of the total C3 products; (c) passing the catalyst through said stripping zone; (d) passing the stripped catalyst from the stripping zone to the catalyst regeneration zone where the catalyst is regenerated in the presence of an oxygen-containing gas; (e) recycling the regenerated catalyst to the reaction zone; (f) fractionating the cracked product to produce a $C_3$ fraction, a $C_4$ fraction rich in olefins, and optionally a $C_5$ fraction rich in olefins.

In another embodiment of the present invention the catalyst is a ZSM-5 type catalyst.

In an embodiment of the present invention a $C_5$ fraction rich in olefins is also recycled.

In another embodiment of the present invention the feedstock contains about 10 to 30 wt. % paraffins, and from about 20 to 70 wt. % olefins.

In another embodiment of the present invention the reaction zone is operated at a temperature from about 525° C. to about 600° C.

DETAILED DESCRIPTION OF THE INVENTION

Feedstreams that are suitable for producing the relatively high $C_2$, $C_3$, and $C_4$ olefin yields are those streams boiling in the naphtha range containing from about 5 wt. % to about 35 wt. %, preferably from about 10 wt. % to about 30 wt. %, and more preferably from about 10 to 25 wt. % paraffins, and from about 15 wt. %, preferably from about 20 wt. % to about 70 wt. % olefins. The feed may also contain naphthenes and aromatics. Naphtha boiling range streams are typically those having a boiling range from about 65° F. to about 430° F. (about 18° C. to about 225° C.), preferably from about 65° F. to about 300° F. (about 18° C. to about 150° C.).

The naphtha can be a thermally cracked or a catalytically-cracked naphtha. The naphtha streams can be derived from the fluid catalytic cracking (FCC) of gas oils and resids, or they can be derived from delayed or fluid coking of resids. Preferably, the naphtha streams used in the practice of the present invention derive from the fluid catalytic cracking of gas oils and resids. FCC naphthas are typically rich in olefins and/or diolefins and relatively lean in paraffins. It is within the scope of the instant invention to feed or co-feed other olefinic streams that are not catalytically- or thermally-cracked naphthas into said reaction zone with the primary feed. It is believed that this will increase the yield of propylene.

In another embodiment of the present invention, a $C_4$ olefin stream containing n-butenes is co-fed with the naphtha feed. The $C_4$ olefin stream may come from suitable sources such as conventional FCC units, coker units, steam crackers and other process units that produce $C_4$ olefins streams that can be recycled to the cracking unit. In one embodiment, the $C_4$ olefin stream may be a raffinate from a methyl-tert-butyl-ether (MTBE) process. MTBE units typically feed a mixture of methanol and $C_4$ olefins. Only the iso-butylene reacts with the methanol to yield MTBE, leaving a significant amount of $C_4$ olefins, including n-butenes, in the MTBE raffinate.

The $C_4$ olefin stream preferably comprises at least about 75 wt. % n-butenes, more preferably greater than about 90 wt. % n-butenes. Streams containing lower amounts of n-butenes are also acceptable, such as where a stream containing a significant amount of diolefins, such as butadiene, is employed. When the $C_4$ olefin stream is injected into the reaction zone along with the naphtha feed, the $C_4$ olefins undergo rapid disproportionation reactions with other olefins in the naphtha feed, followed by cracking reactions. These reactions increase propylene yields.

The process of the present invention is performed in a process unit comprising a reaction zone, a stripping zone, a catalyst regeneration zone, and a fractionation zone. The naphtha feed is fed into the reaction zone where it contacts a source of hot, regenerated catalyst. The hot catalyst vaporizes and cracks the feed at a temperature from about 500° C. to about 650° C., preferably from about 525° C. to about 600° C. The cracking reaction deposits coke on the catalyst, thereby deactivating the catalyst. The cracked products are separated from the coked catalyst and sent to a fractionator. The coked catalyst passes through the stripping zone where a stripping medium, such as steam, strips volatiles from the catalyst particles. The stripping can be preformed under low-severity conditions to retain a greater fraction of adsorbed hydrocarbons for heat balance. The stripped catalyst is then passed to the regeneration zone where it is regenerated by burning coke on the catalyst in the presence of an oxygen containing gas, preferably air. Decoking restores catalyst activity and simultaneously heats the catalyst to a temperature from about 650° C. to about 750° C. The hot regenerated catalyst is then recycled to the reaction zone to react with fresh naphtha feed. Flue gas formed by burning coke in the regenerator may be treated for removal of particulates and for conversion of carbon monoxide. The cracked products from the reaction zone are sent to a fractionation zone where various products are recovered, particularly a $C_3$ fraction, a $C_4$ fraction, and optionally a $C_5$ fraction. The $C_4$ fraction and the $C_5$ fraction will typically be rich in olefins. One or both of these fractions can be recycled to the reactor. They can be recycled to either the main section of the reactor, or a riser section, or a stripping section. It is preferred that they be recycled to the upper part of the stripping section, or stripping zone. Recycling one or both of these fractions will convert at least a portion of these olefins to propylene.

It may also be desirable to inject a $C_4$ olefin stream into the stripper section. Such a $C_4$ olefin stream (not to be confused with a $C_4$ fraction recycled from the cracked products of the cracking process) would be derived from one or more suitable sources such as conventional FCC units, coker units, steam crackers and other process units that produce $C_4$ olefins streams that can be recycled to the cracking unit. In one embodiment, the $C_4$ olefin stream may be a raffinate from a methyl-tert-butyl-ether (MTBE) process as previously described. In another embodiment, the $C_4$ olefin stream injected into the stripper section also preferably comprises at least about 75 wt. % n-butenes, more preferably greater than about 90 wt. % n-butenes. Streams containing lower amounts of n-butenes are also acceptable, such as where a stream containing a significant amount of diolefins, such as butadiene, is employed.

While attempts have been made to increase light olefins yields in the FCC process unit itself, the present invention uses its own distinct process unit, as previously described, which receives naphtha from a suitable source in the refinery. The reaction zone is operated at process conditions that will maximize $C_2$ to $C_4$ olefins (particularly propylene) selectivity with relatively high conversion of $C_5$+olefins. Suitable catalysts used with the present invention contain a crystalline zeolite having an average pore diameter less than about 0.7 nanometers (nm), said crystalline zeolite comprising from about 10 wt. % to about 50 wt. % of the total fluidized catalyst composition. It is preferred that the crystalline zeolite be selected from the family of medium-pore size (<0.7 nm) crystalline aluminosilicates, otherwise referred to as zeolites. Of particular interest are the medium-pore zeolites with a silica to alumina molar ratio of less than about 75:1, preferably less than about 50:1, and more preferably less than about 40:1, although some embodiments may incorporate a silica to alumina ratio greater than 40:1. The pore diameter, also referred to as effective pore diameter, is measured using standard adsorption techniques and hydrocarbonaceous compounds of known minimum kinetic diameters. See Breck, *Zeolite Molecular Sieves*, 1974 and Anderson et al., J. Catalysis 58, 114 (1979), both of which are incorporated herein by reference.

Medium-pore size zeolites that can be used in the practice of the present invention are described in "Atlas of Zeolite Structure Types", eds. W. H. Meier and D. H. Olson, Butterworth-Heineman, Third Edition, 1992, which is hereby incorporated by reference. The medium-pore size zeolites generally have a pore size from about 5 Å, to about 7 Å and include for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred is ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. All of the above patents are incorporated herein by reference. Other suitable medium-pore size zeolites include the silicoaluminophosphates (SAPO), such as SAPO-4 and SAPO-11 which is described in U.S. Pat. No. 4,440,871; chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates.

The medium-pore-size zeolites can include "crystalline admixtures" which are thought to be the result of faults occurring within the crystal or crystalline area during the synthesis of the zeolites. Examples of crystalline admixtures of ZSM-5 and ZSM-11 are disclosed in U.S. Pat. No. 4,229,424, which is incorporated herein by reference. The crystalline admixtures are themselves medium-pore-size zeolites and are not to be confused with physical admixtures of zeolites in which distinct crystals of crystallites of different zeolites are physically present in the same catalyst composite or hydrothermal reaction mixtures.

The catalysts of the present invention may be held together with an inorganic oxide matrix material component. The inorganic oxide matrix component binds the catalyst components together so that the catalyst product is hard enough to survive interparticle and reactor wall collisions. The inorganic oxide matrix can be made from an inorganic oxide sol or gel which is dried to "bind" the catalyst components together. Preferably, the inorganic oxide matrix is not catalytically active and will be comprised of oxides of silicon and aluminum. It is also preferred that separate alumina phases be incorporated into the inorganic oxide matrix. Species of aluminum oxyhydroxides-g-alumina, boehmite, diaspore, and transitional aluminas such as a-alumina, b-alumina, g-alumina, d-alumina, e-alumina, k-alumina, and r-alumina can be employed. Preferably, the alumina species is an aluminum trihydroxide such as gibbsite, bayerite, nordstrandite, or doyelite. The matrix material may also contain phosphorous or aluminum phosphate.

Process conditions include temperatures from about 500° C. to about 650° C., preferably from about 500° C. to 600° C.; hydrocarbon partial pressures from about 10 to 40 psia (about 70-about 280 kPa) to about, preferably from about 20 to 35 psia (about 140- about 245 kPa); and a catalyst to naphtha (wt/wt) ratio from about 3 to 12, preferably from about 4 to 10, where catalyst weight is total weight of the catalyst composite. Steam may be concurrently introduced with the naphtha stream into the reaction zone, with the steam comprising up to about 50 wt. % of the naphtha feed. Preferably, the naphtha residence time in the reaction zone is less than about 10 seconds, for example from about 1 to 10 seconds. The reaction conditions will be such that at least about 60 wt. % of the $C_5$+olefins in the naphtha stream are converted to $C_4$- products and less than about 25 wt. %, preferably less than about 20 wt. % of the paraffins are 40 (a catalyst that contains ZSM-5) which had been steamed at 1500° F. (~815° C.) for 16 hrs to simulate commercial equilibrium. Comparison of Examples 1 and 2 show that increasing Cat/Oil ratio improves propylene yield, but sacrifices propylene purity. Comparison of Examples 3 and 4 and 5 and 6 shows reducing oil partial pressure greatly improves propylene purity without compromising propylene yield. Comparison of Examples 7 and 8 and 9 and 10 shows increasing temperature improves both propylene yield and purity. Comparison of Examples 11 and 12 shows decreasing cat residence time improves propylene yield and purity. Example 13 shows an example where both high propylene yield and purity are obtained at a reactor temperature and cat/oil ratio that can be achieved using a conventional FCC reactor/regenerator design for the second stage.

TABLE 1

| Example | Feed Olefins, wt % | Temp. ° C. | Cat/Oil | Oil psia | Oil Res. Time, sec | Cat Res. Time, sec | Wt. % $C_3^-$ | Wt. % $C_3^-$ | Propylene Purity, % | Wt. % $C_2^-$ | Wt. % $C_2^-$ | Ratio of $C_3^-$ to $C_2^-$ | Ratio of $C_3^-$ to $C_2^-$ | Wt. % $C_3^-$ |
|---|---|---|---|---|---|---|---|---|---|---|---|---|---|---|
| 1 | 38.6 | 566 | 4.2 | 36 | 0.5 | 4.3 | 11.4 | 0.5 | 95.8% | 2.35 | 2.73 | 4.9 | 4.2 | 11.4 |
| 2 | 38.6 | 569 | 8.4 | 32 | 0.6 | 4.7 | 12.8 | 0.8 | 94.1% | 3.02 | 3.58 | 4.2 | 3.6 | 12.8 |
| 3 | 22.2 | 510 | 8.8 | 18 | 1.2 | 8.6 | 8.2 | 1.1 | 88.2% | 2.32 | 2.53 | 3.5 | 3.2 | 8.2 |
| 4 | 22.2 | 511 | 9.3 | 38 | 1.2 | 5.6 | 6.3 | 1.9 | 76.8% | 2.16 | 2.46 | 2.9 | 2.6 | 6.3 |
| 5 | 38.6 | 632 | 16.6 | 20 | 1.7 | 9.8 | 16.7 | 1.0 | 94.4% | 6.97 | 9.95 | 2.4 | 1.7 | 16.7 |
| 6 | 38.6 | 630 | 16.6 | 13 | 1.3 | 7.5 | 16.8 | 0.6 | 96.6% | 6.21 | 8.71 | 2.7 | 1.9 | 16.8 |
| 7 | 22.2 | 571 | 5.3 | 27 | 0.4 | 0.3 | 6.0 | 0.2 | 96.8% | 1.03 | 1.64 | 5.8 | 3.7 | 6.0 |
| 8 | 22.2 | 586 | 5.1 | 27 | 0.3 | 0.3 | 7.3 | 0.2 | 97.3% | 1.48 | 2.02 | 4.9 | 3.6 | 7.3 |
| 9 | 22.2 | 511 | 9.3 | 38 | 1.2 | 5.6 | 6.3 | 1.9 | 76.8% | 2.16 | 2.46 | 2.9 | 2.6 | 6.3 |
| 10 | 22.2 | 607 | 9.2 | 37 | 1.2 | 6.0 | 10.4 | 2.2 | 82.5% | 5.21 | 6.74 | 2.0 | 1.5 | 10.4 |
| 11 | 22.2 | 576 | 18.0 | 32 | 1.0 | 9.0 | 9.6 | 4.0 | 70.6% | 4.99 | 6.67 | 1.9 | 1.4 | 9.6 |
| 12 | 22.2 | 574 | 18.3 | 32 | 1.0 | 2.4 | 10.1 | 1.9 | 84.2% | 4.43 | 6.27 | 2.3 | 1.6 | 10.1 |
| 13 | 38.6 | 606 | 8.5 | 22 | 1.0 | 7.4 | 15.0 | 0.7 | 95.5% | 4.45 | 5.76 | 3.3 | 2.6 | 15.0 |

$C_2^- = CH_4 + C_2H_4 + C_2H_6$ converted to $C_4$- products, and that propylene comprises at least about 90 mol. %, preferably greater than about 95 mol % of the total $C_3$ reaction products with the weight ratio of propylene/total $C_2$- products greater than about 3.5.

Preferably, ethylene comprises at least about 90 mol. % of the $C_2$ products, with the weight ratio of propylene:ethylene being greater than about 4, and that the "full range" $C_5$+ naphtha product is enhanced in both motor and research octanes relative to the naphtha feed. It is within the scope of this invention to pre-coke the catalysts before introducing the feed to further improve the selectivity to propylene. It is also within the scope of this invention to feed an effective amount of single-ring aromatics to the reaction zone to also improve the selectivity of propylene versus ethylene. The aromatics may be from an external source such as a reforming process unit or they may consist of heavy naphtha recycle product from the instant process.

The following examples are presented for illustrative purposes only and are not to be taken as limiting the present invention in any way.

EXAMPLES 1–12

The following examples illustrate the criticality of process operating conditions for maintaining chemical grade propylene purity with samples of cat naphtha cracked over ZCAT- The above examples (1,2,7 and 8) show that $C_3^-/C_2^- > 4$ and $C_3^-/C_2^{-31} > 3.5$ can be achieved by selection of suitable reactor conditions.

EXAMPLES 14–17

The cracking of olefins and paraffins contained in naphtha streams (e.g. FCC naphtha, coker naphtha) over small or medium-pore zeolites such as ZSM-5 can produce significant amounts of ethylene and propylene. The selectivity to ethylene or propylene and selectivity of propylene to propane varies as a function of catalyst and process operating conditions. It has been found that propylene yield can be increased by co-feeding steam along with cat naphtha to the reactor. The catalyst may be ZSM-5 or other small or medium-pore zeolites. Table 2 below illustrates the increase in propylene yield when 5 wt. % steam is co-fed with an FCC naphtha containing 38.8 wt. % olefins. Although propylene yield increased, the propylene purity is diminished. Thus, other operating conditions may need to be adjusted to maintain the targeted propylene selectivity.

TABLE 2

| Example | Steam Co-feed | Temp. C. | Cat/Oil | Oil psia | Oil Res. Time, sec | Cat Res. Time, sec | Wt % Propylene | Wt % Propane | Propylene Purity, % |
|---|---|---|---|---|---|---|---|---|---|
| 14 | No  | 630 | 8.7 | 18 | 0.8 | 8.0 | 11.7 | 0.3 | 97.5% |
| 15 | Yes | 631 | 8.8 | 22 | 1.2 | 6.0 | 13.9 | 0.6 | 95.9% |
| 16 | No  | 631 | 8.7 | 18 | 0.8 | 7.8 | 13.6 | 0.4 | 97.1% |
| 17 | Yes | 632 | 8.4 | 22 | 1.1 | 6.1 | 14.6 | 0.8 | 94.8% |

EXAMPLES 18–21

ZCAT-40 was used to crack cat cracker naphtha as described for the above examples. The coked catalyst was then used to crack a $C_4$ stream composed of 6 wt. % n-butane, 9 wt. % i-butane, 47 wt. % 1-butene, and 38 wt. % i-butene in a reactor at the temperatures and space velocities indicated in the table below. As can be seen from the results in the table below, a significant fraction of the feed stream was converted to propylene.

TABLE 3

| WHSV, Hr-1 | 35 | 18 | 12 | 6 |
|---|---|---|---|---|
| Temperature ° C. | 575 | 575 | 575 | 575 |
| Butylene Conversion wt. % | | | | |
| Product Yields, wt. % | | | | |
| Ethylene | 2.4 | 4.7 | 5.9 | 8.8 |
| Propylene | 20.5 | 27.1 | 28.8 | 27.4 |
| Butylenes | 39.7 | 29.0 | 25.5 | 19.2 |
| $C_1$—$C_4$ Light Saturates | 18.2 | 19.2 | 19.8 | 22.0 |
| $C_5$+ Products | 19.3 | 20.0 | 20.0 | 22.6 |

Light olefins resulting from the preferred process may be used as feeds for processes such as oligimerization, polymerization, co-polymerization, terpolymerization, and related processes (hereinafter "polymerization") to form macromolecules. Such light olefins may be polymerized both alone and in combination with other species, in accordance with polymerization methods known in the art. In some cases it may be desirable to separate, concentrate, purify, upgrade, or otherwise process the light olefins prior to polymerization. Propylene and ethylene are preferred polymerization feeds. Polypropylene and polyethylene are preferred polymerization products made therefrom.

What is claimed is:

1. A process for producing propylene comprising the steps of:
   (a) feeding a naphtha stream comprising from about 10 to 30 wt. % paraffins and between about 15 to 70 wt. % olefins to a process unit comprising a reaction zone, a stripping zone, a catalyst regeneration zone, and a fractionation zone;
   (b) feeding a stream comprising $C_4$ olefins to said process unit;
   (c) contacting the naphtha stream with a fluidized bed of catalyst in the reaction zone to form a cracked product, the catalyst comprising a crystalline zeolite having an average pore diameter of less than about 0.7 nm and wherein the reaction zone is operated at a temperature from about 5000 to 650° C., a hydrocarbon partial pressure of 10 to 40 psia, a hydrocarbon residence time of 1 to 10 seconds, and a catalyst to feed weight ratio between about 4 and about 10, thereby producing a reaction product wherein no more than about 20 wt. % of paraffins are converted to olefins and wherein propylene comprises at least about 90 mol. % of the total $C_3$ products;
   (d) passing the catalyst through said stripping zone;
   (e) passing the stripped catalyst from the stripping zone to the catalyst regeneration zone where the catalyst is regenerated in the presence of an oxygen-containing gas;
   (f) recycling the regenerated catalyst to the reaction zone;
   (g) fractionating the cracked product to produce a $C_3$ fraction, a $C_4$ fraction rich in olefins, and optionally a $C_5$ fraction rich in olefins;
   (h) recycling the $C_4$ fraction rich in olefins to the reaction zone, stripping zone, or both.

2. The process of claim 1 wherein the C4 olefin stream is fed into the reaction zone.

3. The process of claim 2 wherein the $C_4$ olefin stream is also fed into the stripping zone.

4. The process of claim 1 wherein the $C_4$ olefin stream is fed into the stripping zone.

5. The process of claim 1 wherein the $C_4$ olefin stream is a MTBE product stream, an FCC product stream, a stream cracker product stream, or a coker product stream.

6. The process of claim 1 wherein the $C_4$ olefin stream is an MTBE raffinate stream.

7. The process of claim 1 wherein the $C_4$ olefin stream is passed to the process unit from a steam cracker.

8. The process of claim 1 wherein the $C_4$ olefin stream comprises at least about 75 wt. % n-butenes.

9. The process of claim 1 wherein the crystalline zeolite is selected from the ZSM series.

10. The process of claim 9 wherein the crystalline zeolite is ZSM-5.

11. The process of claim 10 wherein the reaction temperature is from about 500° C. to about 600° C.

12. The process of claim 10 wherein at least about 60 wt. % of the $C_5$+ olefins in the feedstream is converted to $C_4$– products and less than about 25 wt. % of the paraffins are converted to $C_4$– products.

13. The process of claim 12 wherein propylene comprises at least about 95 mol. % of the total $C_3$ products.

14. The process of claim 13 wherein the weight ratio of propylene to total $C_2$– products is greater than about 3.5.

15. The process of claim 1 further comprising the step of producing said $C_5$ fraction and recycling said $C_5$ fraction to the reaction zone, the stripping zone, or both.

16. The process of claim 1 further comprising the step of separating propylene from the $C_3$ fraction and polymerizing the propylene to form polypropylene.

* * * * *